Patented Nov. 2, 1943

2,333,202

UNITED STATES PATENT OFFICE 2,333,202

COMPOUNDS OF THE CYCLOPENTANOPOLY-HYDROPHENANTHRENE SERIES AND PROCESS OF MAKING SAME

Leopold Ruzicka, Zurich, and Albert Wettstein, Basel, Switzerland, assignors, by mesne assignments, to Ciba Pharmaceutical Products, Incorporated, Summit, N. J., a corporation of New Jersey No Drawing. Application July 12, 1938, Serial No. 218,876. In Switzerland July 14, 1937

7 Claims. (Cl. 260—397.4)

By this invention ketones of the cyclopentanopolyhydrophenanthrene series are obtained by causing a carboxylic acid or carboxylic acid derivative of the said series to react with an organic metal compound.

As parent materials for the invention there may be used quite generally saturated or mono- or poly-unsaturated compounds of the cyclopentanopolyhydrophenanthrene series containing in a side chain a carboxyl group or a derivative of the carboxyl group such as a substituted or unsubstituted carboxylic acid amide group, further nitrile, carboxylic acid halide, anhydride, ester or salt group; that is to say for example compounds of this kind derived from bodies of the type of aetio-cholane, pregnane, oestrane, hydrooestrane and their stereo-isomers, homologues and partially dehydrogenated products. Moreover the carboxylic acid residue may be connected directly with the cyclic nucleus, for example in position 17 or 3, or it may be separated from the nucleus by one or more carbon atoms. Such carboxylic acid derivatives are obtainable for example by progressive or radical degradation from sterols, bile acids or genins from cardiac glucosides, or by synthesis from cyclic ketones etc. Besides the carboxylic acid residues the parent materials may naturally contain further substituents, for example substituted or unsubstituted hydroxyl, carbinol, amino or hydrocarbon groups, also halogen atoms, cyclic keto-groups and in particular enol derivatives thereof such as enol-esters or enol ethers. In the latter case the enol groups may be reconverted into keto-groups after the reaction. Especially one starts also from compounds which carry a carboxyl-group or carboxylic acid-derivative-grouping as well as a hydroxyl-, acyloxy- or alkoxy-group at the same ring carbon atom, for example in position 17 or 3. As parent materials there may be particularly named for example saturated and unsaturated halides, nitriles, amides (also substituted amides), anhydrides or esters of aetio-cholanic acids such as 3-oxy-, 3-keto- and/or -17-oxy-aetio-cholanic acids, 3:11-diketo- or 3-keto-11-oxy- and/or -17-oxy-aetio-cholanic acids, also corresponding compounds of the bisnor-cholanic acid, cholane-17-acetic acid, nor-cholanic acid or 3-carboxy-aetio-cholanic acid series, analogous carboxylic acids of the oestrone or hydro-oestrone series or derivatives thereof, for example esters, ethers, enol-esters or enol-ethers, as well as stereoisomers of these compounds, especially compounds which differ in the configuration at carbon atoms 3, 5, 9, 11, 17 and/or 20.

By organic metal compounds are understood saturated and unsaturated compounds of metals such as alkali metals, magnesium, zinc, cadmium, mercury, copper, aluminium or tin, with substituted or unsubstituted hydrocarbon residues, the substituents being especially any monovalent radical containing carbon, e. g. one or more alkyl-, cycloalkyl-, aralkyl-, aryl-, cyanogen-, or substituted carboxyl groups. For example there are named: metal hydrocarbon compounds such as lithium-methyl, sodium benzyl, phenyl-potassium or acetylene-potassium, or dialkyls or zinc, magnesium or mercury, aluminium-trialkyls, tin-di- and -tetra-alkyls; also organic metal halides, for example of calcium, mercury, tin or lead but especially those of magnesium and zinc, such as methyl-, ethyl-, allyl-, vinyl-, acetylene-, methylether-, cyclohexyl-, phenyl- or benzyl-magnesium or -zinc-halides, or their components. Finally there may be used metal derivatives of compounds having an active methylene group such as derivatives of $\beta$-dicarboxylic acids or $\beta$-keto carboxylic acids or $\beta$-diketones, for example also the derivatives monosubstituted in the active methylene group. Metal derivatives of $\beta$-keto-carboxylic acids or of $\beta$-diketones are derived from the enolized compounds, but the enolates in this process actually react as if the metal atoms were connected directly to the carbon atom of the keto forms. The expression "organo metallo compounds" as used in the appended claims is therefore also intended to cover these derivatives. Further there may be named compounds derived from malonic acid esters, malonamide and malonitrile, analogous cyanoacetic acid and acetoacetic acid derivatives, acetyl acetone etc. and their substitution products and homologues, containing e. g. alkali metals, copper, aluminium etc.

Since the reactivity of the different organic metal compounds and also that of the carboxylic acids or the different derivatives thereof varies considerably it is necessary that suitable pairs of reactants must be selected and suitable reaction conditions observed in order that ketones may be obtained; this is already known per se (see, for example Houben-Weyl, Methoden der organischen Chemie, 2nd edition, volume 4, pages 777 et seq. and 897 et seq.) Thus for example ketones are obtained without difficulty in good yield by reaction of nitriles or acid amides with Grignard compounds. This is also the case when working appropriately if the parent material is an acid anhydride or an alkali salt of carboxylic acid. When starting with an acid halide it is to be recommended that there should be used for example not appreciably more than the theoretical quantity of a magnesium compound or that there should be used a somewhat less reactive zinc compound in order that the reaction should not proceed beyond the ketone stage. For this purpose there may also be used for example substituted or unsubstituted alkyl-, aralkyl- or aryl-alkali compounds. Finally acid halides may be caused to react with metal derivatives of compounds having an active methylene group and if desired the condensation products thus obtained may be split in known manner and decarboxylated, that is to say for example they may be saponified, subjected to ketone scission or acid scission and so on. Instead of using an already prepared organic metal compound it is also to be recommended to cause the individual components of the compound to act on the carboxylic acid or acid derivative; this is particularly the case when the organic metal compound is difficultly accessible or is indeed not known as such, for example in the case of chloromethyl ether, vinyl bromide and the like.

The reaction mixture may be worked up according to known methods. Thus for example when a magnesium or zinc compound is used the addition compound containing metal which is generally formed as the primary product may be decomposed with a dilute acid. If the process starts with a nitrile oxide the ketoxime produced may also be converted into a ketone by a somewhat more energetic action of an acid. Finally if there is used for the reaction a 17-oxy-, 17-acyloxy- or 17-alkoxy-carboxylic acid or acid derivative the reaction product may be subjected, if desired, directly or after further reaction to the action of an agent which splits off water, acid or alcohol and if desired the double linkage formed may be hydrogenated. Such a direct hydrogenation may of course also take place when starting for example from 16:17-unsaturated compounds.

Naturally other substituents may enter into reaction with the organic metal compounds in addition to the carboxyl groups and their derivatives. Thus Grignard compounds react for example also with hydroxyl, amino, acyloxy, keto and aldehyde groups and less readily also with halogen groups. In the former cases, however, the substituents are restored in unchanged or merely saponified form when the magnesium addition product is decomposed. Keto-groups present may be protected by intermediate conversion into enol derivatives such as enol-esters or enol-ethers if it is not desired that they shall react.

The ketones of the cyclopentanopolyhydrophenanthrene series obtainable by the invention are compounds of therapeutic value or can be converted into such compounds.

The following examples illustrate the invention, the parts being by weight:

Example 1

4.8 parts of $\Delta^{5:6}$-3-acetoxy-17-benzoxy-aetiocholenic acid (obtainable from $\Delta^{5,6}$-3,17-dioxy-aetiocholenic acid, prepared according to copending application Serial No. 215,056, by treating gently with acetic acid anhydride, and then with benzoic acid chloride in pyridine) are suspended in 7 parts of absolute benzene and 50 parts of thionyl chloride are added. The whole is heated on the water bath until evolution of gas ceases and the solution is then evaporated to dryness under reduced pressure and the acid chloride obtained in this manner is dissolved in absolute toluene. There is then added to the solution whilst cooling a solution of 2.1 parts of methyl zinc iodide in toluene prepared in the usual manner and the whole is allowed to stand at room temperature for a short time. The reaction mixture is then decomposed with cold dilute hydrochloric acid and the toluene layer is diluted with ether and washed with dilute hydrochloric acid, then with dilute sodium carbonate solution and finally with water. After the solution has been dried by means of sodium sulphate it is evaporated under reduced pressure and the residue is sublimed in a high vacuum at about 180° C., whereby benzoic acid is split off. The sublimate is dissolved in ether and the ethereal solution is washed with dilute sodium carbonate solution and with water and then evaporated. In this manner there is obtained the crude acetate of $\Delta^{5:6}$-$\Delta^{16:17}$-pregnadiene-ol-(3)-one-(20) which without further purification can be partially hydrogenated in presence of a nickel catalyst prepared according to the method of Raney to the acetate of $\Delta^{5:6}$-pregnenol-(3)-one-(20). For this purpose it is dissolved in 80 parts of ethyl alcohol of 95 per cent strength and after addition of 1.5 parts of Raney nickel the solution is shaken with hydrogen at room temperature until 1 mol of hydrogen has been absorbed. The solution is then filtered and evaporated and the residue is recrystallized from dilute alcohol. There is thus obtained the acetate of $\Delta^{5:6}$-pregnenol-(3)-one-(20) which crystallises in needles of melting point 147° C. and from this by saponification there is obtained $\Delta^{5:6}$-pregnenol-(3)-one-(20) of melting point 193° C. and having the formula

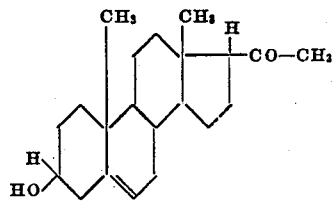

The reaction may be conducted with zinc dimethyl instead of with methyl zinc iodide. If ethyl zinc iodide, dipropyl zinc or the like is used homologues of the pregnenolone are obtained. The reduction of the 16:17-double linkage may also be conducted with other catalysts or also for example by means of zinc and glacial acetic acid. Instead of the acid chloride there may be used as parent material another halide of the acid or also for example acid amides, anhydrides or salts of the acid.

If instead of acetoxy-benzoxy-aetio-cholenic acid the 3-enol-acetate of $\Delta^{4:5}$-3-keto-aetiocholenic acid is used $\Delta^{4:5}$-pregnene-dione-(3:20) (progesterone) is obtained directly by reaction of the acid halide with for example zinc dimethyl and saponification.

Example 2

To a solution of 1 part of dimethyl zinc in 2 parts of benzene there is added by drops while cooling and in a nitrogen atmosphere a solution of 10 parts of $\Delta^{5:6}$-3.17-diacetoxy-aetiocholenic acid chloride (obtainable by reaction of the free acid, prepared according to copending application Serial No. 215,056, with thionyl chloride) in 50 parts of benzene. A vigorous reaction can be ascertained with each drop. The whole is rotated for a short time and there are then added, at first carefully, about 500 parts of water. The mixture is acidified with hydrochloric acid and extracted with ether. The ethereal solution is carefully washed with n-caustic soda solution, dried and evaporated. By crystallization of the residue from acetone or, when working in greater batches from methanol there is obtained the $\Delta^{5:6}$-3.17-diacetoxy-pregnenone-(20) of the formula

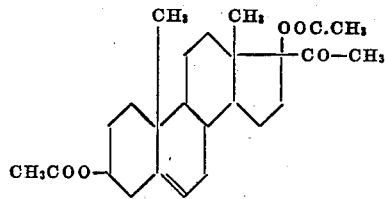

It yields the free $\Delta^{5:6}$-17-oxy-pregnenol-(3)-one-(20) when saponified in an alkaline solution.

Instead of dimethyl zinc there may also be used methyl zinc halides, or the acid halide can be caused to react with metal-malonic esters or -acetoacetic esters and subsequently hydrolized and decarboxylated. When using organic metal compounds which introduce higher hydrocarbon radicals, such as diethyl zinc, benzyl zinc bromide, sodium ethyl malonic esters and the like there are obtained homologues of the oxy-pregnenolone.

*Example 3*

To a solution of 1.8 parts of sodium malonic ester in absolute alcohol there is added, at first cautiously, a solution in benzene of 3.5 parts of $\Delta^{4:5}$-3-keto-aetio-cholenic acid chloride (prepared for example by reaction of the free acid, obtainable from $\Delta^{5,6}$-3-oxy-aetiocholenic-acid by oxidation, with thionyl chloride in benzene solution and distillation of the solvent). After the first violent reaction has finished the whole is heated to boiling for several hours whilst stirring. The bulk of the alcohol is then evaporated under reduced pressure and the residue is mixed with water and extracted with ether. The ethereal solution is washed with bicarbonate solution and with water and then evaporated. The residue is crude $\Delta^{4:5}$-3-keto-pregnenone-(20)-21-dicarboxylic acid ester. This is saponified by heating it for 1 hour with alcoholic alkali solution of 2 per cent strength, then the solution is acidified and the product is precipitated with water and extracted with ether. The ethereal solution is washed with water, dried and evaporated and the residue is sublimed in a high vacuum (0.0005 millimetre) at about 115° C. and/or purified by way of its very sparingly soluble disemicarbazone. There is thus obtained pure progesterone of the formula

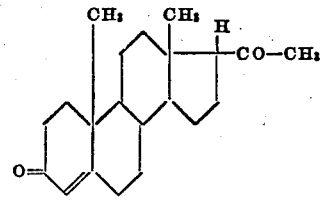

which crystallises in dimorphous forms melting respectively at 120° C. and 129° C.

Instead of 3-keto-aetio-cholenic acid itself an enol derivative of this acid such as an enol-ester or enol-ether may be used as parent material. When starting however from 3-acyloxy-aetiocholenic acid-halides, $\Delta^{5:6}$-pregnenol-(3)-one-(20) is analogously obtained.

Alkali compounds of malonitrile and malonamide, derivatives of cyanoacetic acid and acetoacetic acid may be used instead of sodium malonic ester. In the last case the condensation product is subsequently subjected to acid scission and de-carboxylated, whereby progesterone is likewise obtained. If on the other hand the condensation product is subjected to the ketone scission there is obtained an unsaturated triketone of the cyclopentanopolyhydrophenanthrene series having a β-diketone grouping in the side chain. Tetraketones may be obtained by reaction of the acid halide with metal compounds of acetylacetone or its homologues.

Saturated compounds, such as those of the 3-epioxy-allo-pregnanone-(20) series can also be obtained in an analogous manner.

What we claim is:

1. A process for the manufacture of ketones of the cyclopentanopolyhydrophenanthrene series, which comprises reacting an organo metallo compound with a compound of the said series which bears at the same nuclear carbon atom in 17-position (a) a carboxylic acid halide and (b) a member of the group consisting of hydroxy, acyloxy and alkoxy, until a condensation product results which in its metal-free form contains a new keto group, and then isolating the ketone in metal-free form from the reaction mass.

2. A process for the manufacture of ketones of the cyclopentanopolyhydrophenanthrene series, which comprises reacting an organo metallo compound with a compound of the said series which bears at the same nuclear carbon atom in 17-position (a) a carboxylic acid halide and (b) the group X which is a member of the group consisting of hydroxy, acyloxy and alkoxy, and treating the resultant compound with an agent capable of splitting off HX.

3. A process for the manufacture of ketones of the cyclopentanopolyhydrophenanthrene series, which comprises reacting an organo metallo compound with a compound of the said series which bears at the same nuclear carbon atom in 17-position (a) a carboxylic acid halide and (b) the group X which is a member of the group consisting of hydroxy, acyloxy and alkoxy, treating the resultant compound with an agent capable of splitting off HX, and hydrogenating the double bond formed by splitting off HX.

4. Compounds of the cyclopentanopolyhydrophenantherene-series, containing at the same nuclear carbon atom in 17-position (a) a member of the group consisting of a hydhoxy-, an acyloxy- and an alkoxy-group and (b) the radical of the formula

—CO—X wherein X stands for one of the groups

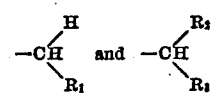

R₁ being a member of the group consisting of lower alkyl and hydrogen, and R₂ and R₃ a member of the group consisting of alkyl, cyanogen, carboxylic acid ester and carboxylic acid amide radicals.

5. The saturated and unsaturated 3-keto-dimethylcyclopentanopolyhydrophenanthrene containing at the same nuclear carbon atom in 17-position (a) a member of the group consisting of a hydroxy-, an acyloxy- and an alkoxy-group and (b) the radical of the formula

wherein X stands for one of the groups

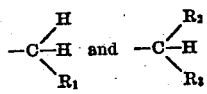

R₁ being a member of the group consisting of lower alkyl and hydrogen and R₂ and R₃ a member of the group consisting of alkyl, cyanogen, carboxylic acid ester and carboxylic acid amide radicals.

6. The compounds of the formula

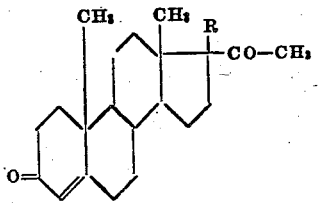

wherein R is a member of the group consisting of a hydroxy-, an acyloxy- and an alkoxy-group.

7. The compounds of the formula

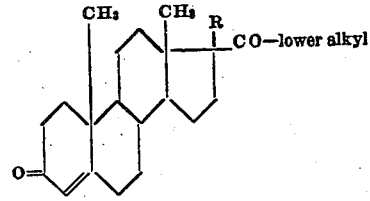

wherein R is a member of the group consisting of a hydroxy-, an acyloxy- and an alkoxy-group.

LEOPOLD RUZICKA.
ALBERT WETTSTEIN.